(12) United States Patent
Tester

(10) Patent No.: US 7,036,452 B1
(45) Date of Patent: May 2, 2006

(54) THERMAL HISTORY INDICATORS

(75) Inventor: Richard Tester, Glasgow (GB)

(73) Assignee: Temp-Tell Limited, Dumbarton (GB)

( * ) Notice: Subject to any disclaimer, the term of this patent is extended or adjusted under 35 U.S.C. 154(b) by 0 days.

(21) Appl. No.: 09/913,022

(22) PCT Filed: Feb. 10, 2000

(86) PCT No.: PCT/GB00/00398

§ 371 (c)(1),
(2), (4) Date: Oct. 23, 2001

(87) PCT Pub. No.: WO00/47964

PCT Pub. Date: Aug. 17, 2000

(30) Foreign Application Priority Data

Feb. 10, 1999 (GB) .................................... 9902817

(51) Int. Cl.
*G01D 21/00* (2006.01)

(52) U.S. Cl. ...................... 116/207; 116/206; 116/216; 374/160

(58) Field of Classification Search ................ 116/206, 116/207, 219, 217, 216, 218; 374/158, 160, 374/162, 106, 101, 102
See application file for complete search history.

(56) References Cited

U.S. PATENT DOCUMENTS

| | | | | |
|---|---|---|---|---|
| 2,020,676 A * | 11/1935 | Ellis et al. | ................... | 374/160 |
| 2,216,127 A * | 10/1940 | McNaught | ................... | 116/207 |
| 2,340,337 A * | 2/1944 | McNaught | ................... | 116/207 |
| 2,553,369 A | 5/1951 | Hoffman | ................... | 73/358 |
| 2,955,942 A * | 10/1960 | Fenity et al. | ................. | 116/201 |
| 2,971,852 A * | 2/1961 | Schulein | ..................... | 116/207 |
| 3,591,810 A * | 7/1971 | Jackson | ..................... | 374/162 |
| 3,822,189 A | 7/1974 | Tornmarck | ............... | 195/103.5 |
| 3,967,579 A * | 7/1976 | Seiter | .......................... | 116/207 |
| 4,022,149 A | 5/1977 | Berger | ...................... | 116/114.5 |
| 4,057,029 A * | 11/1977 | Seiter | .......................... | 116/207 |
| 4,179,397 A * | 12/1979 | Rohowetz et al. | ........ | 252/408.1 |
| 4,280,441 A * | 7/1981 | McNeely | .................... | 116/219 |
| 4,382,700 A * | 5/1983 | Youngren | ................... | 116/216 |
| 4,390,291 A * | 6/1983 | Gaven et al. | ............... | 116/217 |
| 4,408,557 A * | 10/1983 | Bradley et al. | ............. | 116/206 |
| 4,729,671 A * | 3/1988 | Asano et al. | ............... | 116/219 |
| 4,753,188 A * | 6/1988 | Schmoegner | ............... | 116/217 |
| 5,085,802 A | 2/1992 | Jalinski | ..................... | 252/408 |
| 5,182,212 A * | 1/1993 | Jalinski | ..................... | 116/206 |
| 5,325,721 A * | 7/1994 | Pendergrass | ............... | 116/216 |

(Continued)

FOREIGN PATENT DOCUMENTS

FR    EP 0803718    3/1997

(Continued)

*Primary Examiner*—Diego Gutierrez
*Assistant Examiner*—Travis Reis
(74) *Attorney, Agent, or Firm*—Fleshner & Kim LLP

(57) ABSTRACT

A temperature history indicator means for affixing to goods. A temperature related phase change in a material within the indicator leads to an indication that a high temperature event has occurred. A preferred format has a water-soluble, lipid-insoluble dye immobilised within a lipid selected to have a melting point at a particular temperature and has all components made from edible materials. Upon melting, the dye dissolves in water present in a secondary phase or the goods themselves giving a visual indication. Another format has a primary reagent within a solid lipid and a secondary reagent held with a secondary phase such that melting of the lipid allows the primary reagent to react with the secondary reagent, providing an indication of a high temperature event. Time-dependent formats are also considered.

36 Claims, 8 Drawing Sheets

U.S. PATENT DOCUMENTS

| | | | | |
|---|---|---|---|---|
| 5,667,303 A | * | 9/1997 | Arens et al. | 116/219 |
| 5,709,472 A | * | 1/1998 | Prusik et al. | 116/219 |
| 5,756,356 A | * | 5/1998 | Yanagi et al. | 116/206 |
| 6,029,601 A | | 2/2000 | Suya | 116/217 |
| 6,103,351 A | * | 8/2000 | Ram et al. | 116/219 |
| 6,198,701 B1 | * | 3/2001 | De Jonghe et al. | 116/206 |

FOREIGN PATENT DOCUMENTS

| | | |
|---|---|---|
| GB | EP 0250217 | 12/1987 |
| WO | WO 8707373 | 12/1987 |
| WO | WO 9109287 | 6/1991 |
| WO | WO 9214998 | 3/1992 |

* cited by examiner

THERMAL HISTORY INDICATORS

BACKGROUND OF THE INVENTION

The present invention relates to the field of thermal history indicators and time-temperature indicators. These are devices which display a physical change in response to their temperature history and are typically attached to or integrated with temperature sensitive goods in order to provide a quality control and/or quality assurance indicator.

Many goods sold at the present time are temperature sensitive. For example, fresh food produce needs to be kept in a rigidly temperature controlled environment until it is sold. This has implications for manufacturers, distributors, retailers and consumers.

Distributors are faced with the technological problem of maintaining temperature of goods within a very tight specification for local, national and international distribution of goods. As a result of this need, it is necessary to verify that goods have been distributed under the required conditions for reasons of quality control and quality assurance.

Manufacturers and retailers have a duty of care to their customers. When dealing with produce that is temperature sensitive, they must not only control and verify the temperature under which goods are stored and processed internally but will also want to receive proof that raw materials and supplies have been looked after properly. When mistakes in temperature regulation are not noted, goods may be spoiled and unsellable or, worse, may lead to damage to the consumer for which the vendor becomes liable.

Consumers also face problems related to the temperature control of goods they have purchased. To take an example, milk can spoil extremely quickly if allowed to warm up for a period of time. Consumers would benefit from a way of finding out whether or not retailers are storing goods appropriately. Furthermore, consumers would prefer to purchase goods which they believe have been stored correctly prior to their purchase.

At the present time, businesses and retailers typically use thermometers and thermocouples to monitor temperature throughout the food chain. Consumers will not usually monitor temperature of their purchases.

Several organisations currently manufacture and sell time-temperature indicators. These are devices which can be attached to, or be incorporated in packaging and which provide a visual indicator of the temperature history of the label and, therefore, the produce to which it is attached.

The 3M Monitor Mark contains a dye which moves along a scale when the indicator is above a certain melting point. This suffers from the disadvantages of not being edible, not having a clear link between the length the dye has moved along the scale and the temperature history of the product and also requires to be kept below its freezing point before use.

The Lifelines Fresh-Check Indicator uses time and temperature sensitive polymers which gradually deepen in colour. The product is considered to be off when an inner ring made of temperature sensitive material becomes darker than an outer ring. This suffers from the disadvantage that the range of thermal sensitivities which the polymer can adopt are not continuous. Usually, different sensitivities are achieved by varying the colour of the printed outer ring. Care is also required by the user when deciding whether the inner or outer ring is darker. This product also requires refrigeration before use and, indeed, must be kept at a particularly cold temperature to ensure that the sensor has not been triggered. Examples of relevant Patents are U.S. Pat. No. 5,709,472; U.S. Pat. No. 4,892,677 and U.S. Pat. No. 4,735,745.

VITSAB sell time temperature indicators in which an enzyme reaction causes a solution to change from deep green to bright yellow as a result of a controlled pH decrease. A reference colour is printed nearby to enable a viewer to establish whether temperature storage conditions have been violated. One useful benefit of this technology is that the two solutions involved are separated by a divider which can be manually broken, mixing the two solutions (See SE508602 and WO9838112). This allows the label to be transported at ambient temperature and to be activated only when it is ready for use. However, this tag is expensive and fragile and may leak; it is not clear whether the enzyme and chemicals involved are entirely non-toxic. Furthermore, as the colour changes gradually, it becomes difficult for a user to judge when the colour has reached the shade of the reference colour.

These products have so far not been commonly used due to their expense, supply problems with raw materials, limitations to their applicability, toxicity, fragility, sensitivity and the difficulty of manufacture.

SUMMARY OF THE INVENTION

The present invention aims to provide a time-temperature indicator which:
- is flexible in its application and can be used in many different operating environments;
- can give a permanent, semi-permanent or non-permanent record;
- can respond also to the passage of time as well as high temperature events, for example to indicate when a product has been stored too long, even if stored at the correct temperature;
- is simple to use;
- is easy and cheap to manufacture and use;
- is reliable and has reproducible properties;
- is non-toxic, indeed is actually edible when required for food applications;
- is adaptable for a plurality of environments;
- has an expiry recognition system that is adaptable, for instance not simply limited to a colour change;
- can be adapted to react quickly or slowly to temperature changes; and
- can be understood regardless of the linguistic base of the user.

According to a first aspect of the present invention, there is provided a thermal history indicator for attachment to goods, the indicator comprising a temperature sensitive material selected to melt at a predetermined temperature; wherein melting of the temperature sensitive material leads to provision to the user of an indication that the temperature of the indicator has exceeded the predetermined temperature.

Preferably, the temperature sensitive material is edible.

Preferably also, the temperature sensitive material is a lipid.

The temperature sensitive material may provide a visual image through its shape and which melts at the particular temperature, thereby losing its shape, destroying the visual image and thereby indicating that the particular temperature has been exceeded.

The temperature sensitive material may be mounted on a support, the support being adapted for mounting on goods.

The indicator may have a chamber within which the temperature sensitive material is held, the chamber being adapted such that the temperature sensitive material obscures a visual indicator and configured such that melting of the temperature sensitive material results in the visual indicator becoming visible.

Preferably, the chamber is hemispherical and adapted so that the temperature sensitive material flows from the top to the bottom of the hemispherical chamber on melting.

Preferably, the temperature sensitive material has a primary reagent immobilised therein; the primary reagent is released upon melting of the temperature sensitive material and the released primary reagent provides an indication that the particular temperature has been exceeded.

The temperature sensitive material may be a lipid, the primary reagent may be a water-soluble dye and the released water-soluble dye may form a colour on contact with water in the goods to which the indicator is affixed, the formation of the colour leading to a visual indication that the particular temperature has been exceeded.

Preferably, the thermal history indicator has a secondary phase located so that when the temperature sensitive material melts, the primary reagent comes into contact with the secondary phase, wherein contact between the primary reagent and the secondary phase leads to an indication that the particular temperature has been exceeded.

Typically, the primary reagent interacts with the secondary phase itself in such a way as to produce a colour change.

Typically, the secondary phase has a secondary reagent held therein, wherein the first reagent and secondary reagent react giving a product which provides a visual indication.

Typically also, the first and secondary reagents are, in either order, an enzyme and a substrate for the enzyme.

The temperature sensitive material and the secondary phase may be separated by a physical gap.

The temperature sensitive material and the secondary phase may be separated by a temperature sensitive barrier.

The temperature sensitive barrier may have a gate which is opened by a thermostat.

The temperature sensitive barrier may be a layer of material which melts at a particular temperature.

The temperature sensitive material and the secondary phase may be separated by a physical barrier which can be broken and thereby made permeable by a user.

The indicator may have a means for urging molten temperature sensitive material into contact with the secondary phase.

The thermal history indicator may be configured so that the primary reagent diffuses through the secondary phase, thereby producing a temperature indication that varies with time.

Preferably, the primary reagent is a water-soluble dye.

According to a second aspect of the present invention, there is provided a data encoding image comprising a thermal history indicator arranged such that the data encoded by the data encoding image changes when the particular temperature is exceeded.

Preferably, the data encoding image is a bar code.

According to a third aspect of the present invention there is provided a temperature history indicator comprising a cylinder, a piston and an indicator which can be viewed through a window, the cylinder having therein a material that changes volume with temperature thereby driving the piston, the piston being linked to the indicator such that motion of the piston is coupled to motion of the indicator, wherein motion of the indicator changes the part of the indicator which can be seen through the window, wherein a first portion of the indicator can be viewed through the window at a first temperature and a second portion of the indicator can be viewed through the window at a second temperature, the first and second portions of the indicator having visually different information thereon and thereby indicating that a temperature change has taken place.

Preferably, the temperature history indicator is adapted so that motion of the piston is irreversible.

According to a fourth aspect of the present invention there is provided an indicator for providing temperature sensitive visual images on goods, the indicator comprising lipid formed into a visual image, the lipid being selected to melt above a particular temperature, thereby destroying the visual image.

BRIEF DESCRIPTION OF THE DRAWINGS

An example embodiment of the present invention will now be described with reference to the following Figures in which.

DETAILED DESCRIPTION OF PREFERRED EMBODIMENTS

Figure 1:
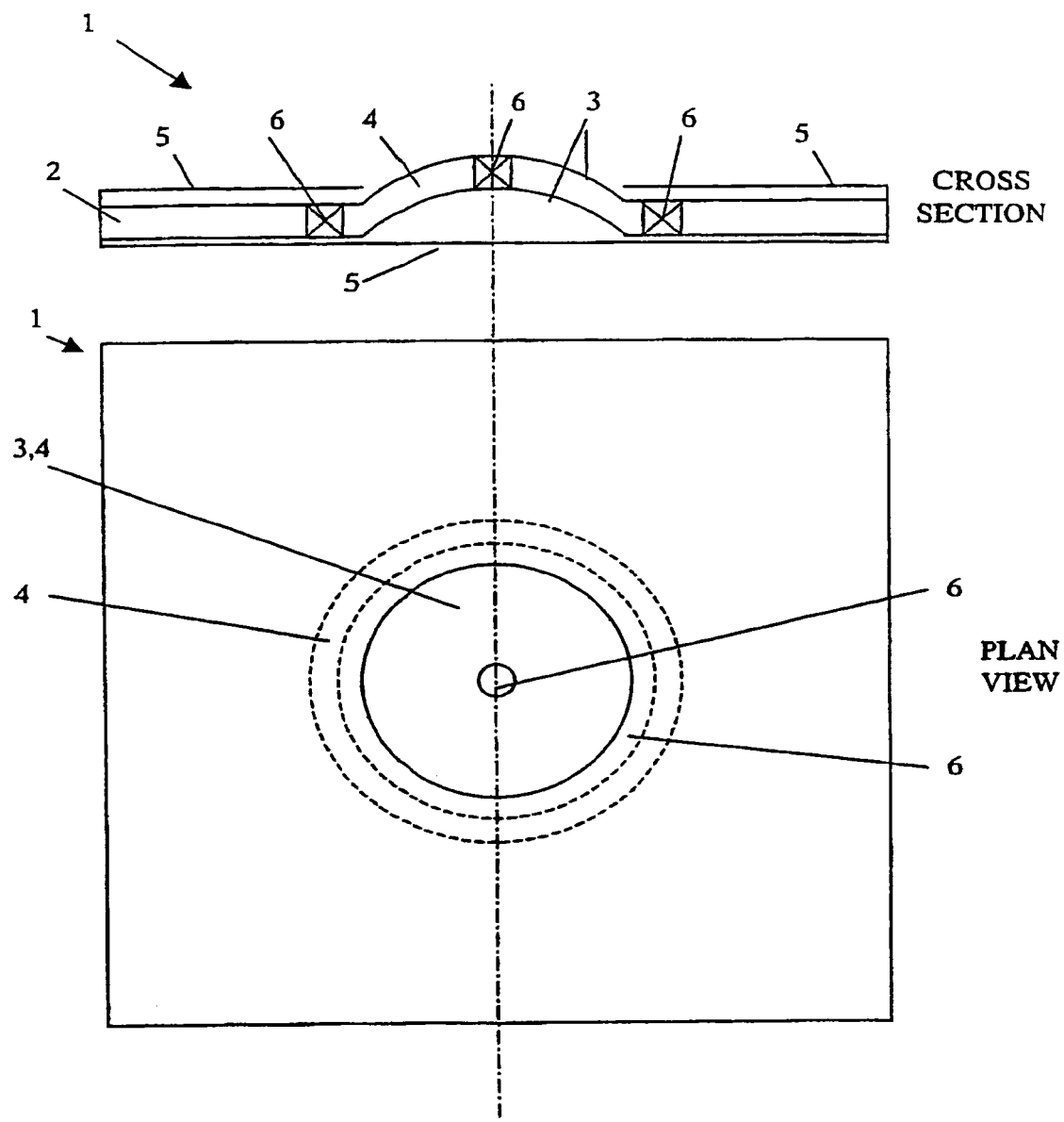
FIG. 1 is a plan view and elevation of a temperature history indicator.

The invention herein disclosed is adapted to monitor temperature-time transformations of products (e.g. foods, pharmaceuticals, hormones, micro-organisms, vaccines, electrical goods, patients, animals), processing techniques, living environments (homes and abodes), working environments, leisure environments, transport, distribution systems etc. The applications are almost limitless and the technology will be of value wherever temperature and time permanent records are required.

The technology is based around coupling phase transitions of materials to the provision of a record. Phase transitions such as solid to liquid, liquid to gas, solid to gas, liquid crystal to liquid and the like take place at defined temperatures and provide a dramatic change in the structure of a material. Some basic prior art has coupled phase transitions to indicators; for example, a pop-up indicator is disclosed in U.S. Pat. No. 4,356,790 wherein a biased spring moves once a material against which it presses is melted.

In the present invention, there are provided a primary reactant which is capable directly or through a reaction with another component, of acting as an indicator.

In one embodiment, the primary reactant simply disperses when the primary immobilising phase undergoes a phase transitions. In another embodiment, there are two chemical components, the primary and secondary reactants, which can together undergo a chemical reaction which results in a change, such as an colour change, that functions as an indicator. However, the primary reactant is immobilised within a material, known as the primary immobilising phase, and thereby kept separate from the secondary reactant until such time as the primary immobilising phase undergoes a phase transition which releases the primary reactant. The secondary reactant may simply be water; for instance, a dyestuff may be used as primary reactant which is colourless in a lipid-based primary immobilising phase but has colour when in contact with water (the water acting as secondary reactant or secondary immobilising phase).

The primary immobilising phase is chosen to undergo a phase transition at a desired temperature and/or to otherwise break down and release the primary immobilising phase with time. The phase transition may for example be melting, sublimation, evaporation, formation or breakdown of liquid-crystal phase etc. The preferred transition is melting. The secondary reactant may also be immobilised in a secondary immobilising phase.

When the primary and secondary reactants meet and undergo a reaction, a colour, smell or other indicator is provided that can be sensed by an observer.

Considerations relating to the primary immobilising phase, secondary immobilising phase (if present) and indication mechanism will now be presented in turn, followed by more detailed examples.

Primary Immobilising Phase

A key development in the present invention is the use of lipids as the primary immobilising phase (PIP). Although any appropriate material with defined (sharp or broad) phase transitions may be used (e.g. waxes and hydrocarbons), data and experimental results disclosed herein show that lipids are ideal materials for use in time-temperature indicators for two important reasons. Firstly, a great many different lipids can be readily purchased or manufactured with different melting points. Therefore, it is easy to tune the trigger temperature of the system by selecting a different lipid. Secondly, lipids are safe to use and are generally edible. Further benefits are that they are readily and cheaply available, can be readily modified and derivatised, have physical and chemical characteristics compatible with time-temperature indicators and are hydrophobic. Hydrophobicity is of great benefit as, in an indicator format in which the secondary reactant is kept in an aqueous phase, the primary immobilising phase will not dissolve nor readily allow unwanted mixing of the primary and secondary reactants.

Because of the normal operating environments for this technology and their broad range of chemical and physical properties and safety, lipids (fats, oils, conjugates, mixtures of etc.) and their derivatives are extensively used (singly or mixtures) herein. Within this document and the appended claims, the term lipid includes all waxes, esters of fatty acids, simple and compound lipids. Upon melting, the primary reactant (PR) or reactants (PRs) are released. The PR can itself be the indicator of change or can further react with another component (below). Table shows the melting temperatures of example hydrocarbons and similar organic molecules, which although not all lipids, could be used as PIPs with melting transitions from around 0 to 20° C. Table 2 shows the equivalent properties of fatty acids.

TABLE 1

Examples of PIPs - Melting Transitions from around 0 to 20° C.

| Compound | Melting Temperature (° C.) |
| --- | --- |
| 1-bromotetradecane | 4.5 |
| 1-bromotridecane | 6.0 |
| 2-cyclopentene-6-tridecenoic acid | 6.0 |
| 5-decanol | 8.7 |
| 1,13-dibromotridecane | 8–10 |
| 6-dodecanone | 9 |
| 5-dodecenoic acid | 1–1.3 |
| Glycerol 2-9, 12-octadecadienoate | 8.9 |
| 9-henicosene | 3 |
| 1-hexadecene | 4.1 |
| 2-methylheptadecane | 5.7 |
| 6-methylheptanoic acid | 0 |
| Methanoic acid | 8.4 |
| Methyl dodecanoate | 5.1 |
| Methyl tridecanoate | 5.8 |
| 2-nonenoic acid | 0.3 |
| 8-nonenoic acid | 5 |
| 11,14-octadecadienoic acid | 4.5–5.5 |
| 9-octadecen-2,4,6-triynedioic acid | 0 |
| 9-octyl-9-heptadecanol | 8–9 |
| 2-(octylthio) ethanol | 0 |
| Methyl 5-oxodecanoic acid | 5 |
| Tetradecane | 5.9 |
| 6-tridecynoic acid | 7.5–8.5 |
| Tridecane | −5.5 |
| Tetradecane | 5.9 |
| Pentadecane | 10 |
| Hexadecane | 18.2 |
| 2,5-undecadiyn-1-ol | 1.2–1.5 |
| 4-undecanone | 4–5 |
| 5-undecanone | 2 |

TABLE 2

Examples of PIPs - Fatty Acid Melting Points

| Systematic Name of Fatty Acid | Fatty Acid mp (° C.) | Methyl Ester mp (° C.) |
| --- | --- | --- |
| Methanoic | 8.4 | — |
| Ethanoic | 16.6 | — |
| Propanoic | −20.8 | — |
| Butanoic | −5.3 | — |
| Pentanoic | −34.5 | −80.7 |
| Hexanoic | −3.2 | −69.6 |
| Heptanoic | −7.5 | −55.7 |
| Octanoic | 16.5 | −36.7 |
| Nonanoic | 12.5 | −34.3 |
| Decanoic | 31.6 | −12.8 |
| Undecanoic | 29.3 | −11.3 |
| Dodecanoic | 44.8 | 5.1 |
| Tridecanoic | 41.8 | 5.8 |
| Tetradecanoic | 54.4 | 19.1 |
| Pentadecanoic | 52.5 | 19.1 |
| Hexadecanoic | 62.9 | 30.7 |
| Heptadecanoic | 61.3 | 29.7 |
| Octadecanoic | 70.1 | 37.8 |
| Nonadecanoic | 69.4 | 38.5 |
| Icosanoic | 76.1 | 46.4 |
| Henicosanoic | 75.2 | — |
| Docosanoic | 80.0 | 51.8 |
| Tricosanoic | 79.6 | 53.9 |
| Tetracosanoic | 84.2 | 57.4 |
| Pentacosanoic | 83.5 | 59.5 |
| Hexacosanoic | 87.8 | 63.5 |
| Heptacosanoic | 87.6 | 64.6 |
| Octacosanoic | 90.9 | 67.5 |

TABLE 2-continued

Examples of PIPs - Fatty Acid Melting Points

| Systematic Name of Fatty Acid | Fatty Acid mp (° C.) | Methyl Ester mp (° C.) |
|---|---|---|
| Nonacosanoic | 90.4 | 68.8 |
| Tricontanoic | 93.6 | 71.5 |

When for example glycerides are used, depending on the crystalline form, there are different melting points as shown in Table 3.

TABLE 3

Examples of PIPs - Monoglyceride Melting Points

| Glycerol-1-alkanoate | Mp β (° C.) | Mp β' (° C.) | Mp α (° C.) |
|---|---|---|---|
| Decanoate | 53 | 49 | 27 |
| Undecanoate | 56.5 | 52 | 36.5 |
| Dodecanoate | 63 | 59.5 | 44 |
| Tridecanoate | 65 | 61 | 50 |
| Tetradecanoate | 70.5 | 67.5 | 56 |
| Pentadecanoate | 72 | 69 | 62 |
| Hexadecanoate | 77 | 74 | 66.5 |
| Heptadecanoate | 77 | 74.5 | 70 |
| Octadecanoate | 81.5 | 79 | 74 |

A broad range of melting points similarly exists for di- and triglycerides—which are equally valuable for this technology.

TABLE 4

Examples of PIPs - Triglyceride Melting Points

| Chain length | Melting Point (° C.) | | | Long Spacing × $10^{-10}$ m | | |
|---|---|---|---|---|---|---|
| | α | β' | β | α | β' | β |
| 8 | −51.0 | −18.0 | 10.0 | — | — | 22.7 |
| 9 | −26.0 | 4.0 | 10.5 | — | 25.3 | 24.9 |
| 10 | −10.5 | 17.0 | 32.0 | 30.2 | 27.7 | 26.5 |
| 11 | 2.5 | 27.0 | 31.0 | 32.7 | 29.8 | 29.6 |
| 12 | 15.0 | 34.5 | 46.5 | 35.6 | 32.9 | 31.2 |
| 13 | 24.5 | 41.4 | 44.5 | 37.8 | 34.2 | 34.0 |
| 14 | 33.0 | 46.0 | 58.0 | 41.0 | 37.3 | 35.7 |
| 15 | 39.0 | 51.5 | 55.0 | 42.9 | 39.2 | 39.2 |
| 16 | 45.0 | 56.5 | 66.0 | 45.8 | 42.5 | 40.8 |
| 17 | 50.0 | 60.5 | 64.0 | 48.5 | 43.8 | 43.5 |
| 18 | 54.7 | 64.0 | 73.3 | 50.6 | 47.0 | 45.1 |
| 19 | 59.0 | 65.5 | 71.0 | 53.1 | 48.1 | 48.2 |
| 20 | 62.0 | 69.0 | 78.0 | 55.8 | 50.7 | 49.5 |
| 21 | 65.0 | 71.0 | 76.0 | 58.5 | 53.2 | 52.7 |
| 22 | 68.0 | 74.0 | 82.5 | 61.5 | 56.0 | 54.0 |

Other phase transitions associated with other materials are not, however, excluded. An alternative example would use solvents (e.g. water) or solutions in which the particular solutes defined the melting point.

Many different lipid systems have been investigated as the melting phase. Fatty acids, monoglycerides, diglycerides and triglycerides are all effective. Care must be taken to retain the appropriate crystalline form (especially the di and triglycerides).

Mixtures of lipids, non-lipids and lipids with non-lipids are also envisaged for the PIP. These may/may not include other non-lipid components.

Secondary Immobilising Phase

In embodiments where there is a secondary reactant (SR), a secondary immobilising phase may be provided. The secondary immobilising phase (SIP) can be any material which can form a matrix to entrap the secondary reactant (SR) or reactants (SRs).

The secondary immobilising phase is often solvent based. Although lipids may form the matrix, typically a permeable matrix is used which entraps water. For example polymer based materials can be used, where polysaccharide based materials are preferred because time dependent biodegradation of these materials can be built in if desired (discussed further below).

A broad range of polymeric—especially polysaccharide systems—have been evaluated for this phase. A readily gelling phase is preferred that can readily entrap a solvent/solution with a small polysaccharide to solvent/solution ratio. Mixtures of these polymers, their derivatives and hydrolysis products are also valuable. Protein gels (like gelatine) work well, although potential problems with BSE favour the use of other gelling materials from plants in particular—like polysaccharides.

Alginic acid, pectin, starch and agar gels have been used successfully, although other polysaccharides can equally be used. Mixtures can also be used. Agar forms very rigid gels, can entrap large volumes of water and other materials, can be blended with for example gelatinised starch, can be sterilised and can contain antimicrobiological agents.

A preferred embodiment uses a lipid as primary immobilising phase and a water containing medium as secondary immobilising phase wherein the primary reactant is a water soluble chemical trapped within the primary immobilising phase.

In several of the examples given below, agar gel is preferred as secondary immobilising phase. When using a gel, the choice of material is important. Agar poorly withstands freeze-thaw cycles (largely independently of concentration), as syneresis occurs. In circumstance where there may be multiple freezer-thaw incidents, it is preferable to use other polysaccharides like iota carrageenan, locust bean and xanthan gums. These we have found to be very successful.

Indication Mechanism

The main trigger which activates the indicator is melting of the PIP. Phase transition of this phase (typically melting, i.e. a solid-liquid transition) releases the reactant which leads to a permanent irreversible change that functions as an indicator. This can be a colour, smell, texture difference etc. If, for example, a lipid is used it can melt and liberate a dye/colour. In a preferred embodiment, non-lipid soluble colours are used which have little colour when particulate in the lipid PIP but are coloured once dissolved in an aqueous SIP. A PR is chosen which can freely dissolve in whatever SIP is chosen.

Although the PR may be a dye or indicator, it may be any chemical species. This can further react with another compound or compounds to indicate a permanent and preferably irreversible change.

The PR may also be a biochemical species like an enzyme or enzyme substrate or a biologically important molecule like a protein, lipid, carbohydrate, mineral, vitamin or element. The PR could be a micro-organism, cellular structure or organism or a substance metabolised by these living species (for example a sugar which could be metabolised by a yeast and coupled to a colour change). A micro-organism could be released on melting of the PIP and then grow, with the growth coupled to a colour change reaction by techniques known to those skilled in the art.

The PR may itself be a solvent (like water) and the PIP may be in the form of an emulsion.

The PR may also be particulate or made from materials such as to create a particular structure which is obvious as a consequence of PIP passing through a phase transition.

The PR may be a volatile material which is entrapped by the PIP. For example an odorous material which is only obvious upon phase transition of the PIP.

The SR may be an immobilised solvent (e.g. water), solution, colloid or suspension. Equally, the SR may be one or more of: chemical; molecule; biochemical (including enzymes and substrates); organism, microorganism or tissue or substrate thereof in some combination.

Application One

The simplest application of this technology is to monitor defrosting, warming and heating of products such as meat, meat products, poultry etc., although any food, pharmaceutical, apparatus, environment etc. would be appropriate. In this example, the indicator is applied directly to the actual product to be monitored.

An appropriate lipid or suitable edible or non-edible material is chosen as PIP with the desired melting point. If for example the transition through 13° C. is required, oleic acid is appropriate.

A far insoluble or soluble dye (or appropriate material) is used as PR and is blended into the lipid. No SIP or SR is required. The preferred option is to use a fat soluble food dye which forms a particulate nature when dispersed in fat. This can then be applied directly to frozen meat 60 (spray, stamp, print etc) in the form of lettering or shapes. If oleic acid is used on frozen meat etc., it instantly freezes and the letter/shape is permanent until the sausage defrosts. Therefore, a visible indicator which may be even be words, such as "SAFE" can be displayed harmlessly on the product and will be destroyed when the temperature of the produce exceeds the melting temperature for a significant period of time.

In a related embodiment, an organization's brand or any other sort of identifier or advertising 61 could be written directly onto a product such as a meat 60, but disappear during the cooking process as it melts.

Alternatively, a thin film of the lipid is applied to the cut of meat etc. below this temperature, the lipid remains intact as a thin film. If the meat is frozen, it is very easy to stamp or brush a small film of the lipid onto the meat directly.

In practice, we have found this to work effectively and well with the following three approaches being particularly successful for, by way of example, applying triglycerides as melt indicators on the surface of meat products such as sausages. It is important to be careful not to modify the crystalline structure of the lipid in a manner which undesirably alters the lipid melting characteristics.

Melting and stamping

Dissolving in appropriate solvent—hexane was especially valuable

Dispersing in a 'gluing' medium. Polysaccharides and gelatine are especially valuable in this respect.

If the meat is wet, the lipid film can be stamped, brushed etc. onto an edible base—rice paper is preferred. Onto this base, another thin film is applied but this time the film contains an/the indicator which may be an edible material (like food colour, above) which becomes obvious when the trigger temperature has been exceeded. If printed on the rice paper, the sandwich disc is then applied to the meat. The transition may be a visible transformation, a smell (i.e. a volatile compound is entrapped), a texture etc. Lettering or shapes printed using the lipid-dye mixture on the rice paper lose their image upon melting providing a useful indication that the product is no longer safe to eat. Food colours have been found to be particularly suitable as PR in this application as they are freely water-soluble and form small particles within the lipid phase without any discernible colour.

When the meat is heated, the lipid melts and the food colour interacts with the water from the meat and a visible smear is obvious. The meat can of course be eaten without any harm from the indicator, although the indicator shows that it has been heated above a safe storage regime.

EXAMPLE 1

To 1 g of oleic acid at room temperature (where it is a liquid), 10 mg of patent blue was added. The dye was dispersed by thorough mixing whereupon the particles are dispersed throughout the lipid. Shapes and letters were drawn and written onto frozen sausages, frozen burgers and egg shells for eggs previously stored in a refrigerator. The mixture rapidly solidifies on the surface and can be happily stored in the freezer (meat) or refrigerator (egg) without any change. However, upon defrosting, the lipid melts and the image is lost. In addition, the food dye stains the meat (blue) indicating that it has defrosted. It has to be noted that this is a natural event when the food is legitimately defrosted for food use, and the food can be eaten as normal.

For foods that are refrigerated, the rice paper disc approach is most appropriate and can successfully indicate a temperature transition. Using the same lipid and dye, the defrosting of burgers has been successfully monitored.

EXAMPLE 2

Discs of rice paper were soaked in oleic acid and the excess lipid was drained away. The discs were cooled to 5° C. To the surface of this phase, shapes (or lettering) of oleic acid containing patent blue (as above) were applied. Many technologies can be used for this purpose, e.g. painting, stamping, spraying, ink jet printing. The discs were cooled and then placed on the surface of sausages and burgers within the refrigerator. Nothing happens until the meat products are removed from the cool environment, whereupon the lipid melts and a permanent record of the thermal exposure is obvious.

EXAMPLE 3

Commercial triglycerides were obtained from a number of suppliers. Two products, one with a peak melting temperature (established by differential scanning calorimetry) of ~65° C. and another with a peak melting temperature of ~74° C. were applied to food products including sausages. Application was achieved in three ways:

By dissolving in solvent (especially hexane) and applying the solution in a form of a shape to the surface of the sausage. Reactants like dyes were also applied to the sausage surface in this way, where they were immobilised in the lipid. The sausages were heated at different temperatures and the core temperature was monitored with respect to melting of the surface lipid layer. Colony counts of surface and core microorganisms were also made as a function of the cooking time. These data are presented in the following tables:

TABLE 17

Average core temperature of collagen cased sausages cooked at 100° C. for up to 1.20 hours in a convection oven

| Time (mins) | Average core temperature (mean of 2) |
|---|---|
| 10 | 44.5 |
| 20 | 68 |
| 30 | 84.5 |
| 40 | 84 |
| 50 | 88.5 |
| 60 | 92 |
| 70 | 94 |
| 80 | 97 |

TABLE 18

Average core temperature of collagen cased sausages cooked at 80° C. for up to 3 hours in a convection oven

| Time (mins/hours) | Average core temperature (mean of 2) |
|---|---|
| 10 mins | 27.5 |
| 20 mins | 41.5 |
| 30 mins | 47.5 |
| 40 mins | 59.5 |
| 50 mins | 63.5 |
| 1 hour | 63 |
| 1.10 hours | 70.5 |
| 1.20 hours | 70.5 |
| 1.30 hours | 70.5 |
| 1.40 hours | 74 |
| 1.50 hours | 75.5 |
| 2.00 hours | 78 |
| 2.10 hours | 78.5 |
| 2.20 hours | 78.5 |
| 2.30 hours | 79.5 |
| 2.40 hours | 79.5 |
| 2.50 hours | 80 |
| 3.00 hours | 80 |

TABLE 19

Average core temperature of collagen cased sausages cooked at 100° C. for up to 1 hour in a convection oven

| Time (mins) | Average core temperature (mean of 2) |
|---|---|
| 10 | 53 |
| 20 | 67 |
| 30 | 80 |
| 40 | 80 |
| 50 | 89.5 |
| 60 | 89 |

Bacterial Analysis of Sausages 10 g sample was taken into 90 ml diluent. Serial dilutions were made (1:10 to 1:10000), and duplicate plates were made.

Before cooking:

| Before cooking: | |
|---|---|
| Dilution | 1:100 was selected |
| Number of colonies/plate | 297 and 44 |
| The average | 171 |
| Therefore | 171 × 10 × 100 = 171000 CFU/g |
| After cooking: (after 30 mins) (Internal temperature 80° C.) | |
| Dilution | 1:10 was selected |
| Number of colonies/plate | 46 and 36 |
| The average | 41 |
| Therefore | 41 × 10 × 10 = 4100 CFU/gram |

The number of bacteria dropped sharply after sausages were cooked at 100° C. for about 30 mins. The availability of bacteria in the cooked sausages was due to the fact that no food is free from micro-organisms unless the food is sterilised to over 121° C. for at least 15 mins.

TABLE 20

Average times when fat was melted on sausages cooked at 80° C. in a convection oven

| | Average time (mins) | Remarks |
|---|---|---|
| Fat in test tube | 10 | Fat started melting at 8 mins |
| Melted fat on sausage | 25.5 | Fat started melting at 20 mins |
| Fat in solvent on sausage | 32.5 | Solvent evaporated at 13 mins |
| Fat in solvent in tube | 5.5 | Fat started melting at 30 mins |

TABLE 21

Average times when fat was melted on sausages cooked at 100° C. in a convection oven

| | Average time (mins) | Remarks |
|---|---|---|
| Melted fat on sausage | 11 | Fat started melting at 8 mins |
| Fat in solvent on sausage | 12 | Fat started melting at 10 mins |
| Fat in gelatine on sausage | 16 | Fat started melting at 12 mins |

TABLE 22

Time when fat melted on sausages cooked at 100° C. in a convection oven. The fat was mixed with solvent, starch, carrageenan and gelatine

| | Average time (mins) |
|---|---|
| Fat in solvent on sausage | 19 |
| Fat in starch on sausage | 20 |
| Fat in carrageenan on sausages | 20 |
| Fat in gelatine on sausage | 20 |

TABLE 23

Time when fat with starch and gelatine at different concentrations were melted on cellulose cased sausages cooked at 100° C. in a convection oven

|  | Conc (%) | Average time (mins) |
|---|---|---|
| Starch on sausages | 3 | 18 |
|  | 4 | 24 |
|  | 5 | 25 |
| Gelatine on sausages | 3 | 22 |
|  | 4 | 22 |
|  | 5 | 18 |

These results show that lipid applied directly to the surface of sausages can be used to provide visible images which are destroyed by heating in conditions appropriate for the safe cooking of sausages.

EXAMPLE 4

Process Monitoring

The technology described above can also be adapted to monitor temperature transfer in food products to assess the effectiveness of processing operations (and related industrial processes).

Small wells are created within little block of high melting temperature fats. A paste of lipid (which may be the same lipid as the block of high melting temperature fat or a different material) containing food colour (e.g. patent blue) was inserted. Into the recess of the small blocks, colouring free lipid was applied. These fat blocks were placed in raw meat pies and the pies were heated. Upon cutting open, only those pies exposed to temperatures above the melting point of the lipids contained dye stains—showing where temperature penetration occurred.

Note that lipid mixtures and mixtures with other products (e.g. carbohydrates, proteins etc) can also be used for this purpose.

EXAMPLE FIVE

FIG. 1 shows a plan view of and cross section through an indicator according to the present invention. An indicator 1 comprises an enclosure 2 with transparent bubble-shaped window 3 within which there is frozen lipid 4. Coloured card 5 makes a backing. When the lipid 4 melts, its runs down from the bubble shaped window 3, revealing the coloured card which indicates there has been an overtemperature event. The lipid is absorbed into absorbent material 6 thereby preventing it reobscuring the card. Importantly, this construction will function at all orientations.

Application Two—Packaging Type Temperature Transition Indicators.

In this application, temperature transition indicators adapted for application to packaging of temperature sensitive items is disclosed.

EXAMPLE SIX

A dyestuff, Patent blue (10 mg), was added to 1 g of oleic acid (although other appropriate lipids, combinations, mixtures etc. can be used) at room temperature (where oleic acid is a liquid). The particles are dispersed throughout the lipid by thorough mixing. The dye/food colour must be water but not fat soluble, since this means that no obvious colour is apparent in the lipid but simply discrete particles.

Into small plastic petri-dish type plates, 1% agar solutions were poured. Gelatine and other polysaccharide systems were also found to be effective, as were polysaccharide mixtures. The agar simply serves as an example. Agar was removed form the centre of the agar plates, and the plates were then cooled below 5° C.

Small volumes of the lipid containing the water soluble dye were pipetted into the agar free region of the petri dishes. The lipid cools on contact with the cold dish. The plates were immediately refrigerated whereupon the lipid was immobilised. In this embodiment, a physical gap separates the dye containing lipid from the agar.

As well as circular set pools of lipid, other geometric forms can and have been readily produced.

In an alternative embodiment, lipid without dye is pipetted into the agar free region. When cooled and solidified, a well is made in this lipid and lipid containing the dye is pipetted into this well. In this embodiment, the dye-free lipid forms an interface layer between they dye containing lipid and the agar.

In both embodiments, the lipid containing the water soluble dye is solidified. It is separated from the agar either by a physical gap or an interface which acts as a physical barrier and responds to temperature. The preferred method is to use a lipid as an interface layer.

In all systems, when the melting point of the lipid is exceed, the lipid containing the water soluble dye melts and runs into the agar. The dye diffuses into the agar and the colour becomes obvious. Any colour may be used provided that it is water soluble.

The rate of colour development throughout the agar is time dependent and can be modified by the gel composition—including agar concentration, adjuncts etc.

The benefit of this approach being that if the dye containing lipid is placed next to the agar (which contains 99% water), although the lipid has not melted, the dye still diffuses from the lipid into the agar and generates a colour. Hence, instead of relying upon a gap in space to separate the agar from the dye containing lipid, a dye free lipid interface can be used very effectively. This has been especially useful when making laminates of the technology where the agar layer is coated with dye free lipid and cooled to solidify the lipid. To the lipid layer, a lipid layer containing water soluble dye is painted and the system is cooled. Hence no interaction between the lipid containing the dye and the agar can occur because of the lipid interface.

The interaction of lipid and agar can also be optimised by design—for example by applying the lipid to a small mound on the dish which forces the lipid-dye mixture to run towards the agar when melted.

To extend the life of the agar, it is necessary to use preservatives as it gets readily infected by bacteria and moulds. Alternatively, sterile production may be employed.

Figure 2:
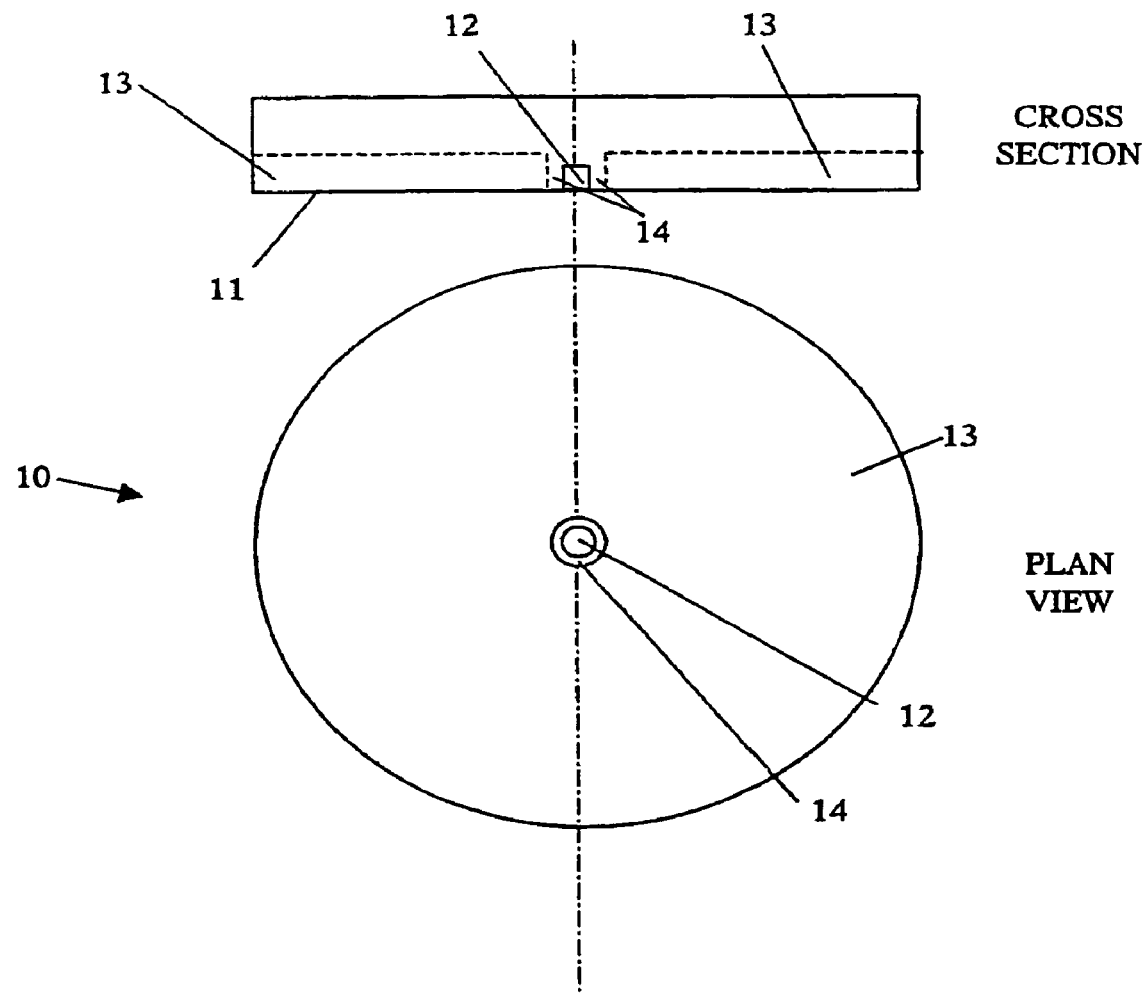
FIG. 2 shows a plan view and elevation of another embodiment of a temperature history indicator.

An example implementation is shown in plan and cross-sectional views in FIG. 2. Indicator 10 consists of a petri dish 11 which has a block of lipid 12 containing a water-soluble, lipid-insoluble dye. Agar gel 13 surrounds the lipid block separated by, in this example, a physical gap 14. A preferred embodiment would use a dye free lipid layer. Upon raising to a temperature where the lipid block 12 melts, the dye is released into the agar gel, becoming visible.

Figure 3:
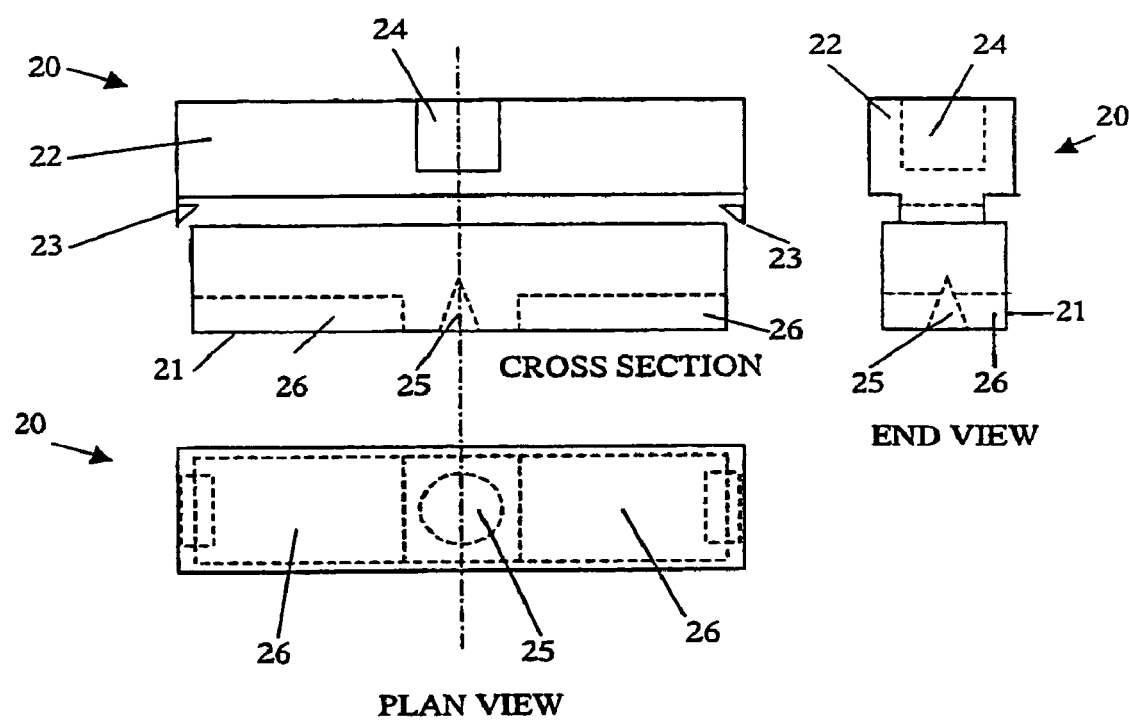
FIG. 3 shows a plan view and elevation of a further embodiment of a temperature history indicator.

FIG. 3 shows an improved embodiment in plan view, cross-section and end view before the final construction stage. Sensor 20 is made from a base 21 to which is clipped a cover 22, using clips 23. Lipid block 24 is positioned so that when it melts, lipid runs onto spike 25 and thereby into contact with agar blocks 26 where indication takes place as above.

EXAMPLE SEVEN

Use of Chemical Reaction to Enhance Indication

The dye diffusion as described above is 'passive' diffusion of a water soluble dye into water (in the agar) to generate colour. The resulting (typically visual) indication can be enhanced and made more striking by designing a system wherein the primary reactant reacts with a secondary reactant present in a secondary immobilising phase.

Agar as secondary immobilising phase has also be produced containing 1–5% sodium bicarbonate or containing given molarities of sodium hydroxide as secondary reactant. In place of the patent blue in the lipid, phenol red, cresol red, phenolphthalein (typically 1%) and other pH indicators have been used as primary reactant. These readily develop a colour upon the contact with the alkali in the agar after the primary immobilising phase (the lipid) has melted. Other chemical colour generating systems have been employed where one reactant resides in the agar and one in the lipid. Systems responsive to pH, silver nitrate interacting with chloride systems, acid (e.g. HCl) reacting with bicarbonate to generate carbon dioxide, dye binding of protein etc. have been evaluated. Other systems are not excluded.

The pH sensitive systems are especially attractive in view of the different colours that can be easily formed. This effect can be multiplied by using different indicators in different lipids (with different melting points).

The key to this approach is, therefore, the provision of a water soluble reactant (which may only be water) acting as secondary reactant in the agar phase (secondary immobilising phase) and a water soluble reactant acting as primary reactant (which may just be a dye) in the solidified lipid (primary immobilising phase). The two reactants meet upon lipid melting.

The version of the system where a circle of agar surrounds a lipid containing dye (with perhaps a dye free lipid interface rather than a gap) is easy to manufacture. However, the laminate approach is easier still to prepare. These are made as follows:

Pour an agar plate (1% with respect to agar and sodium bicarbonate) about 0.5 mm thick. Immediately cool to 5° C. Onto this apply a thin film of oleic acid—which freezes immediately as the agar is less than 5° C. The oleic acid may be painted on, although it is easier to spray it uniformly. Immediately cool to 5° C. Onto this solid lipid film apply a thin film of oleic acid containing 1% cresol red—which also freezes immediately as the lipid interface and agar base are less than 5° C. When the system is placed at room temperature both lipid phases melt and the dye comes into contact with the agar and a red colour develops.

In a trial, Agar plates (1%) containing water or 1% sodium bicarbonate are prepared. From the centre small holes were cut in the agar and oleic acid (mp 13.4° C.) containing congo red dye, cresol red or phenolphthalein.

No colour generation within the agar was identified upon storage at 5 or 10° C. However at 15° C. there was slow generation of colour (<5 minutes). At 25° C. this was very fast (<1 minute).

The polysaccharide gels (variable concentrations) made of water and polysaccharide or containing alkali (like 1% sodium bicarbonate) were stored at refrigeration temperature for up to sixteen weeks and were found to exhibit no change in performance with respect to their ability to operate in the time-temperature devices.

Clearly, the embodiments of FIGS. 2 and 3 can be used to apply this example in practice.

EXAMPLE EIGHT

This Example details a biochemical approach where an enzyme or substrate as primary reactant is immobilised in a lipid primary immobilising phase, with a secondary reactant which undergoes a reaction with the primary reactant in the agar.

In one experiment, mushrooms were purchased from a local shop and freeze dried. The mushrooms were then pulverised to a powder and dispersed throughout oleic acid. Agar (1%) was prepared containing 1% tyrosine and the indicators were configured as described above. Upon melting, the polyphenoloxidase (PPO) from the mushrooms reacts with the tyrosine in the agar and generates a pink colour. This embodiment contains only edible materials and so is likely to be well regarded by the public. The functionality has been further confirmed using commercial PPO.

Hence, as well as the chemical—chemical indication system described above, a biochemical approach can also be used. These can essentially be any enzyme-substrate processes that provides a suitable indication.

It will be clear to one skilled in the art that immunological systems and diagnostic systems may be made using the same approach.

Microorganisms (MOs) have also been immobilised in the lipid phase. Upon melting the MOs come into contact with the agar phase and may thereupon grow and as a consequence produce colour/gas etc. products which may be detected by methods known to those skilled in the art.

Application Three

As well as providing packaging indicators which respond to temperature, it would be desirable to provide indicators which respond also to the passage of time, thereby recognising that certain categories of product, such as foodstuffs, will go off with time even if maintained at their optimum temperature.

The present invention therefore provides in one embodiment an indicator to show time specific changes which contains a water holding medium. This may be an inert material (like for example sponge) although gelling agents are preferred. Examples include proteins (like gelatine), synthetic polymers like 'hydrogel', polysaccharides, and similar materials. Polysaccharides are preferred because of their effectiveness and relatively low cost.

EXAMPLE NINE

Polysaccharide solutions containing one or more polysaccharide were prepared and poured into wells to make strips of gel. The gels were allowed to set and the following experiments were conducted but serve as examples only.

Type of Gelling Agent

Many polymers and polysaccharides (e.g. agar, carrageenan, locust bean gum xanthan, waxy-, normal- and high amylose starches and gelatine) were investigated for their gel strength and ability to support molecular diffusion of water soluble dyes. These polymers were dissolved in water and dilute alkali solutions (since the diffusion was often based on a pH indicator diffusing through the gel and colouring as it diffused). The polymers were stored at freezing, refrigeration and ambient temperatures and their properties were investigated.

Agar and carrageenan (singly or in combination) were preferred media for refrigeration and room temperature use. For sub zero temperatures, locust bean gum and xanthan were preferred (singly or in combination), as they did not exhibit extensive syneresis as a consequence of freeze-thaw cycles.

Effects of Gel Strip Concentration and Dimensions

Polysaccharide solutions were made with 1, 2, 3, 4 and 5% polymer in water and 1% sodium bicarbonate (heating is usually required). The solutions were poured into small plastic troughs which were 0.5, 1.0, 2.0 or 4.0 mm deep, 0.5, 1 cm, 1.5 or 2 cm wide and 5 cm long. Results are shown in the following tables:

TABLE 5

Agar concentration and phenol red diffusion at different strip thickness

| Agar conc | Thickness (mm) | | | |
|---|---|---|---|---|
| | 0.5 | 1 | 2 | 4 |
| 1 | 2.663 | 2.375 | 1.95 | 2.625 |
| 2 | 2.513 | 2.2 | 2.613 | 2.375 |
| 3 | 2.4 | 2.213 | 2.413 | 2.363 |
| 4 | 2.013 | 1.975 | 2.138 | 2.375 |
| 5 | 2.163 | 2.213 | 2.275 | 3.038 |

TABLE 6

Agar concentration and cresol red diffusion at different strip thickness

| Agar conc | Thickness (mm) | | | |
|---|---|---|---|---|
| | 0.5 | 1 | 2 | 4 |
| 1 | 2.538 | 2.888 | 2.5 | 2.588 |
| 2 | 2.213 | 2.5 | 2.4 | 2.588 |
| 3 | 2.25 | 2.063 | 2.225 | 2.413 |
| 4 | 1.788 | 1.738 | 1.775 | 1.713 |
| 5 | 2.06 | 1.975 | 1.725 | 1.875 |

TABLE 7

Agar concentration and phenol red diffusion at different strip sizes

| | Thickness | | | | | | | |
|---|---|---|---|---|---|---|---|---|
| | 0.5 | | | | 1 | | | |
| Strip size | 1 | 2 | 3 | 4 | 1 | 2 | 3 | 4 |
| Agar conc | | | | | | | | |
| 1 | 2.75 | 2.8 | 3 | 2.1 | 2.5 | 2.5 | 2.4 | 2.1 |
| 2 | 2.55 | 2.65 | 2.5 | 2.35 | 2.75 | 2.35 | 1.9 | 1.8 |
| 3 | 2.65 | 2.65 | 2.4 | 1.9 | 2.35 | 2.25 | 2 | 2.25 |
| 4 | 2.25 | 2.1 | 1.9 | 1.8 | 2.25 | 2.25 | 1.65 | 1.5 |
| 5 | 2.5 | 2.25 | 1.9 | 2 | 2.3 | 2.3 | 2.25 | 2 |

TABLE 7-continued

Agar concentration and phenol red diffusion at different strip sizes

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Agar conc | | | | | | | | |
| 1 | 2.2 | 2.1 | 1.55 | 2 | 2.6 | 2.7 | 2.6 | 2.6 |
| 2 | 3 | 2.5 | 2.2 | 2.75 | 2.5 | 2.45 | 2.5 | 2.05 |
| 3 | 2.75 | 2.25 | 2.5 | 2.15 | 2.5 | 2.5 | 2.05 | 2.4 |
| 4 | 2.25 | 2.1 | 2.1 | 2.1 | 2.75 | 2.4 | 2.25 | 2.1 |
| 5 | 2.35 | 2.35 | 2.5 | 1.9 | 3.25 | 3.25 | 2.9 | 2.75 |

TABLE 8

Agar concentration and cresol red diffusion at different strip sizes

| | Thickness | | | | | | | |
|---|---|---|---|---|---|---|---|---|
| | 0.5 | | | | 1 | | | |
| Strip size | 1 | 2 | 3 | 4 | 1 | 2 | 3 | 4 |
| Agar conc | | | | | | | | |
| 1 | 2.55 | 2.55 | 2.55 | 2.5 | 3.15 | 2.9 | 2.75 | 2.75 |
| 2 | 2.6 | 2.35 | 2.1 | 1.8 | 2.75 | 2.75 | 2.45 | 2.05 |
| 3 | 2.3 | 2.2 | 2.5 | 2 | 2 | 2.1 | 2 | 2.45 |
| 4 | 2.2 | 1.75 | 1.65 | 1.55 | 2 | 1.8 | 1.65 | 1.5 |
| 5 | 2.1 | 2.1 | 2 | 2.05 | 2.15 | 1.85 | 1.9 | 2 |

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Agar conc | | | | | | | | |
| 1 | 2.65 | 2.6 | 2.5 | 2.25 | 2.75 | 2.7 | 2.55 | 2.35 |
| 2 | 2.65 | 2.5 | 2.35 | 2.1 | 2.7 | 2.5 | 2.75 | 2.4 |
| 3 | 2.55 | 2.35 | 2 | 2 | 2.7 | 2.25 | 2.6 | 2.1 |
| 4 | 2.1 | 1.9 | 1.5 | 1.6 | 1.8 | 1.75 | 1.55 | 1.75 |
| 5 | 1.85 | 1.75 | 1.65 | 1.65 | 2 | 1.8 | 1.85 | 1.85 |

TABLE 9

Incubation time and phenol red diffusion of different strip thickness of agar concentrations

| Agar conc | days | Thickness (mm) | | | |
|---|---|---|---|---|---|
| | | 0.5 | 1 | 2 | 4 |
| 1% | 1 | 0.5 | 0.5 | 0.5 | 0.5 |
| | 2 | 1 | 1 | 1 | 1 |
| | 3 | 1.5 | 1.5 | 1.5 | 1.5 |
| | 4 | 2.15 | 2.163 | 1.575 | 2.133 |
| | 5 | 2.663 | 2.375 | 1.95 | 2.625 |
| 2% | 1 | 0.5 | 0.5 | 0.5 | 0.5 |
| | 2 | 1.3 | 1.225 | 1.463 | 1.225 |
| | 3 | 1.738 | 1.7 | 2.15 | 1.55 |
| | 4 | 2.088 | 2.05 | 2.4 | 2.013 |
| | 5 | 2.513 | 2.2 | 2.613 | 2.375 |
| 3% | 1 | 0.5 | 0.5 | 0.5 | 0.5 |
| | 2 | 1 | 1 | 1 | 1 |
| | 3 | 1.513 | 1.588 | 1.563 | 1.475 |
| | 4 | 1.813 | 1.913 | 2.138 | 1.963 |
| | 5 | 2.4 | 2.213 | 2.413 | 2.363 |

TABLE 9-continued

Incubation time and phenol red diffusion of different strip thickness of agar concentrations

| Agar conc | days | Thickness (mm) | | | |
|---|---|---|---|---|---|
| | | 0.5 | 1 | 2 | 4 |
| 4% | 1 | 0.5 | 0.5 | 0.5 | 0.5 |
| | 2 | 0.988 | 1.15 | 1.288 | 1.288 |
| | 3 | 1.5 | 1.55 | 1.675 | 1.75 |
| | 4 | 1.888 | 1.888 | 2.125 | 2.113 |
| | 5 | 2.013 | 1.975 | 2.138 | 2.375 |
| 5% | 1 | 0.5 | 0.5 | 0.5 | 0.5 |
| | 2 | 1.138 | 1.313 | 1.225 | 1.875 |
| | 3 | 1.588 | 1.613 | 1.763 | 2.525 |
| | 4 | 1.913 | 2.175 | 1.938 | 2.7 |
| | 5 | 2.163 | 2.213 | 2.275 | 3.038 |

TABLE 10

Incubation time and cresol red diffusion of different strip thickness of agar at different concentrations

| Agar conc | days | Thickness (mm) | | | |
|---|---|---|---|---|---|
| | | 0.5 | 1 | 2 | 4 |
| 1% | 1 | 0.5 | 0.5 | 0.5 | 0.5 |
| | 2 | 1 | 1 | 1 | 1 |
| | 3 | 1.5 | 1.5 | 1.5 | 1.5 |
| | 4 | 2 | 2.038 | 1.95 | 1.98 |
| | 5 | 2.538 | 2.888 | 2.5 | 2.583 |
| 2% | 1 | 0.5 | 0.5 | 0.5 | 0.5 |
| | 2 | 1.25 | 1.3 | 1.238 | 1.35 |
| | 3 | 1.575 | 1.875 | 1.913 | 1.963 |
| | 4 | 2.05 | 2.3 | 2.325 | 2.363 |
| | 5 | 2.213 | 2.5 | 2.4 | 2.588 |
| 3% | 1 | 0.5 | 0.5 | 0.5 | 0.5 |
| | 2 | 1 | 1 | 1 | 1 |
| | 3 | 1.363 | 1.25 | 1.5 | 1.588 |
| | 4 | 2.05 | 1.95 | 1.788 | 2.063 |
| | 5 | 2.25 | 2.063 | 2.225 | 2.413 |
| 4% | 1 | 0.5 | 0.5 | 0.5 | 0.5 |
| | 2 | 0.625 | 1 | 0.825 | 0.813 |
| | 3 | 0.838 | 1.1 | 1.15 | 1.163 |
| | 4 | 1.363 | 1.313 | 1.463 | 1.638 |
| | 5 | 1.788 | 1.738 | 1.775 | 1.713 |
| 5% | 1 | 0.5 | 0.5 | 0.5 | 0.5 |
| | 2 | 1.1 | 1.05 | 0.875 | 0.888 |
| | 3 | 1.438 | 1.463 | 1.163 | 1.05 |
| | 4 | 2.05 | 1.863 | 1.563 | 1.863 |
| | 5 | 2.06 | 1.975 | 1.725 | 1.875 |

TABLE 11

Diffusion of phenol red at different strip sizes and thickness of Gum locust bean and Gum xanthan

| | | Thickness | | | | | | | |
|---|---|---|---|---|---|---|---|---|---|
| | | 0.5 | | | | 1 | | | |
| Strip size | | 1 | 2 | 3 | 4 | 1 | 2 | 3 | 4 |
| Agar conc | | | | | | | | | |
| 1 | 2 | 1.65 | 1.25 | 1.25 | 2.25 | 1.15 | 1 | 1 | |
| 2 | 2 | 1.25 | 1.25 | 1 | 1.75 | 1.4 | 1.15 | 1.25 | |

TABLE 11-continued

Diffusion of phenol red at different strip sizes and thickness of Gum locust bean and Gum xanthan

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Agar conc | | | | | | | | |
| 1 | 1.75 | 1.4 | 1 | 1 | 2 | 1.65 | 1.25 | 1.25 |
| 2 | 1.25 | 1 | 1 | 1 | 1 | 1 | 1 | 1 |

TABLE 12

Diffusion of cresol red at different strip sizes and thickness of Gum locust bean and Gum xanthan

| | Thickness | | | | | | | |
|---|---|---|---|---|---|---|---|---|
| | 0.5 | | | | 1 | | | |
| Strip size | 1 | 2 | 3 | 4 | 1 | 2 | 3 | 4 |
| Agar conc | | | | | | | | |
| 1 | 3 | 2.25 | 1 | 1 | 1.1 | 1.1 | 1 | 1 |
| 2 | 1.75 | 1.15 | 1.15 | 1.15 | 1.6 | 1.6 | 1.4 | 1.35 |

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Agar conc | | | | | | | | |
| 1 | 1.2 | 1.15 | 1.15 | 1.15 | 1.4 | 1.1 | 1.1 | 1 |
| 2 | 1 | 1 | 1 | 1 | 1 | 1 | 1 | 1 |

TABLE 13

Diffusion of phenol red and incubation time of different strip thickness with different carrageenan conc.

| Carr. conc | days | Thickness (mm) | | | |
|---|---|---|---|---|---|
| | | 0.5 | 1 | 2 | 4 |
| 1% | 1 | 0.5 | 0.5 | 0.5 | 0.5 |
| | 2 | 1 | 1.238 | 1.088 | 1.175 |
| | 3 | 1.35 | 1.238 | 1.175 | 1.275 |
| | 4 | 1.763 | 1.438 | 1.475 | 1.75 |
| | 5 | 2.05 | 1.913 | 1.738 | 1.75 |
| 2% | 1 | 0.5 | 0.5 | 0.5 | 0.5 |
| | 2 | 0.9 | 0.938 | 1 | 0.888 |
| | 3 | 1.375 | 1.325 | 1.613 | 1.275 |
| | 4 | 1.925 | 1.55 | 1.663 | 1.525 |
| | 5 | 2.013 | 1.638 | 1.85 | 1.525 |
| 3% | 1 | 0.5 | 0.5 | 0.5 | 0.5 |
| | 2 | 0.75 | 0.988 | 0.925 | 0.788 |
| | 3 | 1.638 | 1.213 | 0.988 | 1.15 |
| | 4 | 1.763 | 1.313 | 1.188 | 1.163 |
| | 5 | 1.975 | 1.475 | 1.288 | 1.188 |
| 4% | 1 | 0.5 | 0.5 | 0.5 | 0.5 |
| | 2 | 0.8 | 0.75 | 0.888 | 0.65 |
| | 3 | 1.5 | 1.1 | 1.625 | 1.13 |
| | 4 | 1.538 | 1.25 | 1.838 | 1.25 |
| | 5 | 1.988 | 1.588 | 1.975 | 1.25 |
| 5% | 1 | 0.5 | 0.5 | 0.5 | 0.5 |
| | 2 | 0.638 | 0.613 | 0.525 | 0.563 |
| | 3 | 0.825 | 0.938 | 0.8 | 0.675 |

TABLE 13-continued

Diffusion of phenol red and incubation time of different strip thickness with different carrageenan conc.

| Carr. conc | days | Thickness (mm) | | | |
|---|---|---|---|---|---|
| | | 0.5 | 1 | 2 | 4 |
| | 4 | 1.088 | 1.125 | 0.9 | 0.9 |
| | 5 | 1.088 | 1.125 | 0.9 | 0.9 |

TABLE 14

Diffusion of cresol red and incubation time of different strip thickness with different carrageenan conc.

| Carr. conc | days | Thickness (mm) | | | |
|---|---|---|---|---|---|
| | | 0.5 | 1 | 2 | 4 |
| 1% | 1 | 0.5 | 0.5 | 0.5 | 0.5 |
| | 2 | 0.975 | 1 | 1.1 | 1.238 |
| | 3 | 1.275 | 1.2 | 1.3 | 1.325 |
| | 4 | 1.638 | 1.363 | 1.4 | 1.538 |
| | 5 | 1.85 | 1.725 | 1.522 | 1.563 |
| 2% | 1 | 0.5 | 0.5 | 0.5 | 0.5 |
| | 2 | 1.388 | 1.313 | 1.125 | 1 |
| | 3 | 1.65 | 1.563 | 1.263 | 1.35 |
| | 4 | 1.913 | 1.813 | 1.725 | 1.488 |
| | 5 | 2.025 | 1.863 | 1.938 | 1.65 |
| 3% | 1 | 0.5 | 0.5 | 0.5 | 0.5 |
| | 2 | 1.063 | 1.063 | 1.125 | 1.125 |
| | 3 | 1.063 | 1.063 | 1.2 | 1.188 |
| | 4 | 1.375 | 1.275 | 1.463 | 1.188 |
| | 5 | 1.375 | 1.338 | 1.463 | 1.25 |
| 4% | 1 | 0.5 | 0.5 | 0.5 | 0.5 |
| | 2 | 0.963 | 1.088 | 0.813 | 1.038 |
| | 3 | 0.963 | 1.163 | 1.013 | 0.963 |
| | 4 | 1.288 | 1.288 | 1.1 | 1.1 |
| | 5 | 1.788 | 1.288 | 1.125 | 1.138 |
| 5% | 1 | 0.5 | 0.5 | 0.5 | 0.5 |
| | 2 | 0.863 | 0.65 | 0.6 | 0.55 |
| | 3 | 0.963 | 0.85 | 0.713 | 0.625 |
| | 4 | 1.175 | 1.363 | 0.85 | 0.75 |
| | 5 | 1.175 | 1.363 | 0.85 | 0.75 |

TABLE 15

Diffusion of phenol red and carrageenan concentration at different strip sizes with different thickness

| | Thickness | | | | | | | |
|---|---|---|---|---|---|---|---|---|
| | 0.5 | | | | 1 | | | |
| Strip size | 1 | 2 | 3 | 4 | 1 | 2 | 3 | 4 |
| Carr. conc | | | | | | | | |
| 1 | 3.15 | 2.15 | 1.45 | 1.45 | 1.9 | 2.5 | 1.75 | 1.5 |
| 2 | 2.9 | 2.15 | 1.5 | 1.5 | 2.25 | 1.6 | 1.35 | 1.35 |
| 3 | 2.75 | 1.9 | 1.85 | 1.4 | 2.25 | 1.4 | 1.25 | 1 |
| 4 | 2.9 | 2.15 | 1.4 | 1.5 | 1.85 | 1.5 | 1.5 | 1.5 |
| 5 | 1.75 | 0.9 | 0.9 | 0.8 | 1.65 | 1.1 | 0.9 | 0.8 |

TABLE 15-continued

Diffusion of phenol red and carrageenan concentration at different strip sizes with different thickness

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Carr. conc | | | | | | | | |
| 1 | 1.9 | 1.5 | 1.9 | 1.65 | 1.75 | 1.75 | 1.75 | 1.75 |
| 2 | 2 | 2 | 1.75 | 1.65 | 2.25 | 1.5 | 1.5 | 0.85 |
| 3 | 1.6 | 1.35 | 1.1 | 1.1 | 1.5 | 1 | 1.25 | 1 |
| 4 | 3 | 2.15 | 1.5 | 1.25 | 1.65 | 1.35 | 1 | 1 |
| 5 | 0.9 | 0.9 | 0.9 | 0.9 | 0.9 | 0.9 | 0.9 | 0.9 |

TABLE 16

Diffusion of cresol red and carrageenan concentration at different strip sizes with different thickness

| | Thickness | | | | | | | |
|---|---|---|---|---|---|---|---|---|
| | 0.5 | | | | 1 | | | |
| Strip size | 1 | 2 | 3 | 4 | 1 | 2 | 3 | 4 |
| Carr. conc | | | | | | | | |
| 1 | 2.5 | 2.1 | 1.65 | 1.15 | 1.8 | 1.9 | 1.6 | 1.6 |
| 2 | 2.75 | 2.25 | 1.7 | 1.4 | 2.5 | 1.65 | 1.65 | 1.65 |
| 3 | 2.25 | 1.15 | 1.05 | 1.05 | 1.85 | 1.1 | 1.1 | 1 |
| 4 | 2 | 1.6 | 1.25 | 1.25 | 2 | 1 | 1 | 1.15 |
| 5 | 1.65 | 1.25 | 0.9 | 0.9 | 2 | 1.15 | 1.15 | 1.15 |

| | Thickness | | | | | | | |
|---|---|---|---|---|---|---|---|---|
| | 2 | | | | 4 | | | |
| Strip size | 1 | 2 | 3 | 4 | 1 | 2 | 3 | 4 |
| Carr. conc | | | | | | | | |
| 1 | 1.6 | 1.5 | 1.5 | 1.5 | 1.75 | 1.5 | 1.5 | 1.5 |
| 2 | 2.5 | 1.75 | 1.75 | 1.75 | 2.25 | 1.55 | 1.4 | 1.4 |
| 3 | 2.15 | 1.4 | 1.15 | 1.15 | 2 | 1 | 1 | 1 |
| 4 | 1.5 | 1.1 | 0.9 | 1 | 1.55 | 1 | 1 | 1 |
| 5 | 1 | 0.8 | 0.8 | 0.8 | 1.05 | 0.65 | 0.65 | 0.65 |

Figure 7:
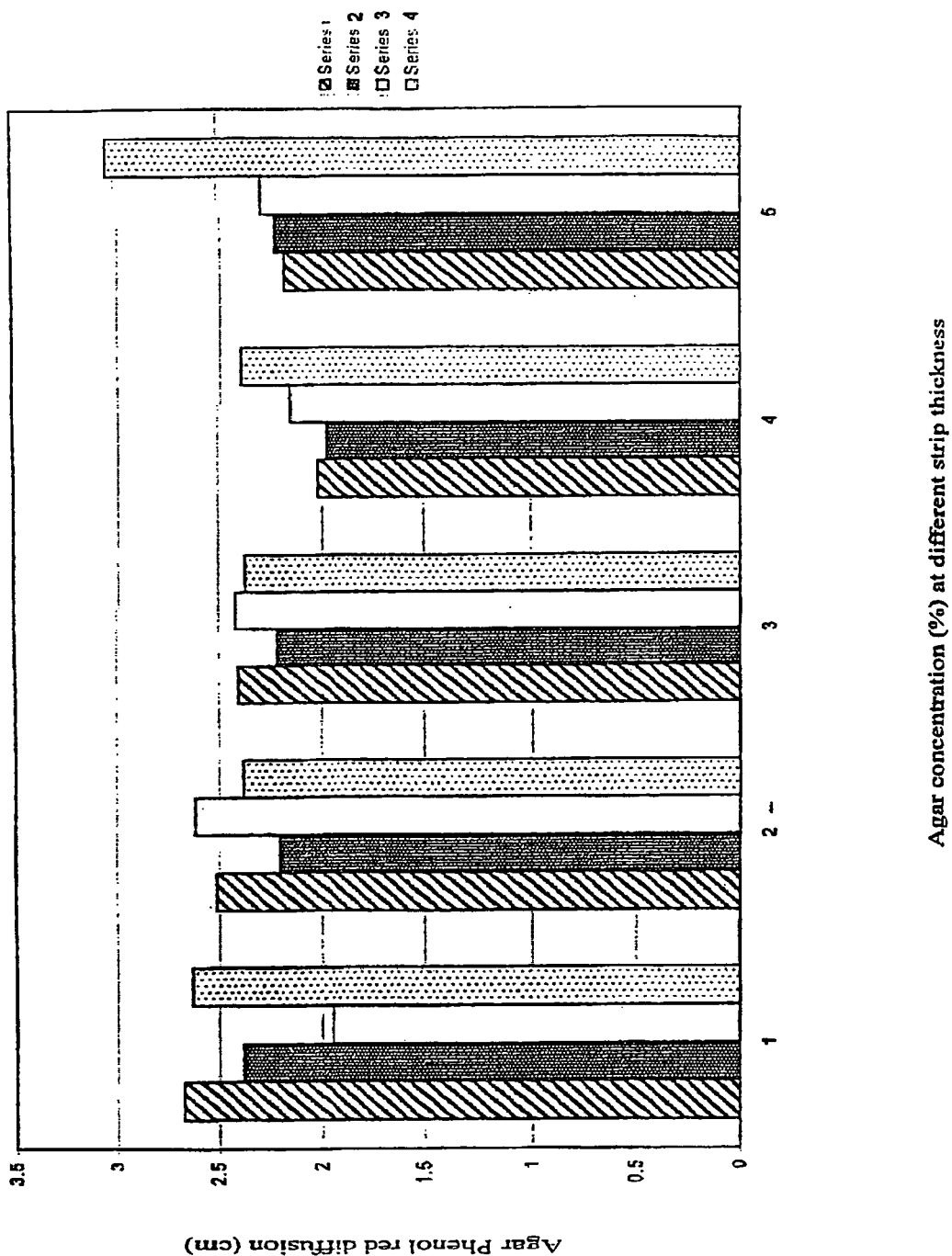
FIG. 7 is a graph of phenol red diffusion through agar strips of different agar concentrations and different thicknesses.
Figure 8:
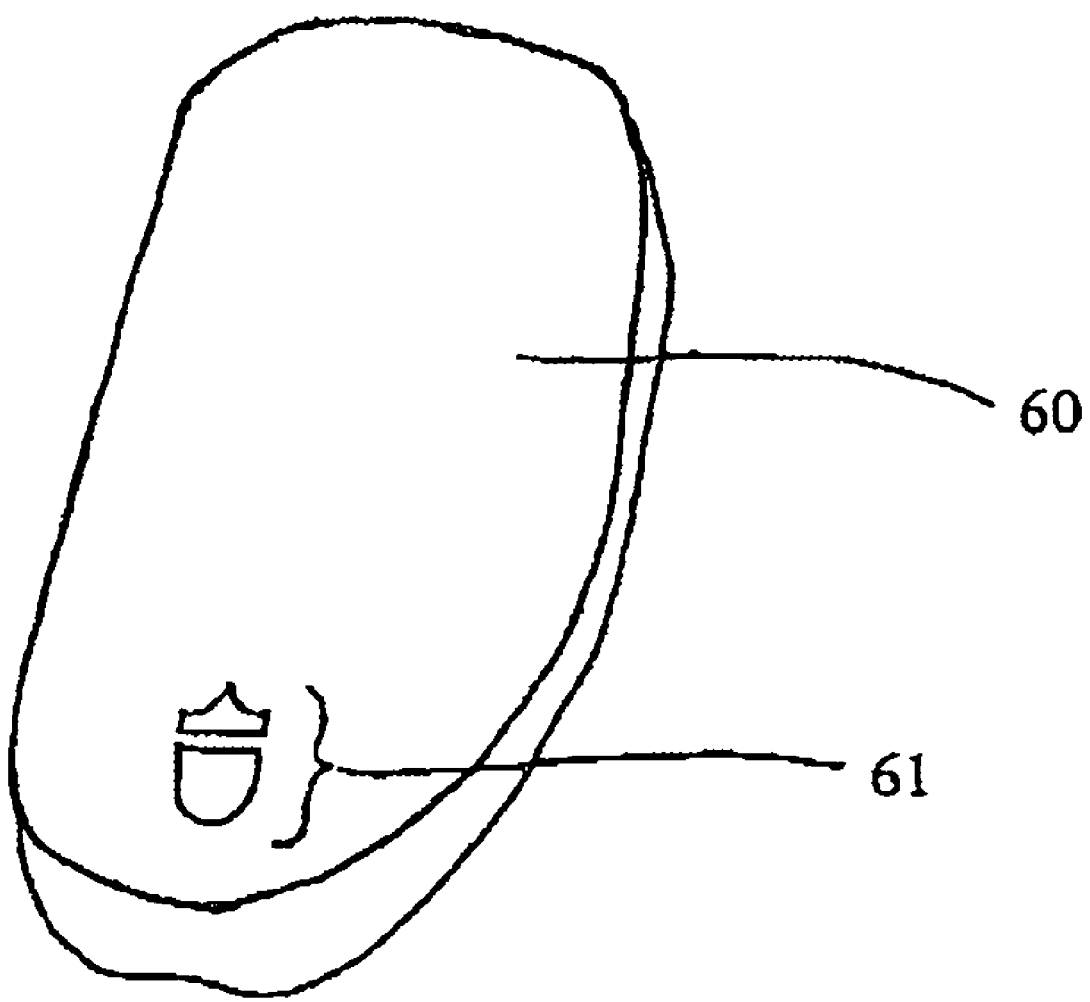
FIG. 8 shows a thermal history indicator applied directly to a surface of a meat.

By way of example, FIG. 7 shows the results of table 5 in graph form.

The above results as a whole show that:

Diffusion of water soluble dyes from one end of the gel to the other is slower as concentration is increased.

Depth or width, for the same amount of dye applied at one end, do have some effect on the rate of dye diffusion. As the depth and width increase the rate of diffusion is reduced.

Length is very important as the diffusion occurs over many days. Typically it takes 5 days for dye dispersed in a liquid fat (e.g. 1% with respect to cresol red or 1% with respect to phenol red) to diffuse from one end to the other of a 3 cm gel strip (2 mm deep and 0.5 cm wide) prepared in 1% sodium bicarbonate solution and stored at 5° C. Hence time dependence and self life dependence could be determined using this approach.

At higher temperatures, the rate of diffusion is increased. For example, for the above experiment it would occur at 3 rather than 5 days if stored at 25° C.

Geometry is not a rate limiting effect on diffusion, as the gels may be stored under any orientation and the diffusion occurs at the same rate. Spirals of the matrix have also been made and work very effectively.

The gels prepared in 1% sodium bicarbonate (2% with respect to polysaccharide) were stored at refrigeration temperatures for up to 16 weeks and no microbiological storage was detected. The gels must, however, not be allowed to dry out.

A modification of these gels strips has been to incorporate gelatinised maize starch with agar gels in the ratios from 25:75% to 75:25% (although any other ratios are not excluded nor combinations of gels containing one or more hydrolysable material) with a total solids concentration of 0.5 to 5%. Before the gels set, thermostable alpha-amylase (e.g. 0.1 to 1 mg ml) was added. Thin strips were cut (as above) and were stored at room temperature. It was found that the rate of diffusion could be increased where the enzyme was present as it slowly hydrolysed the starch component of the matrix. Other polysaccharides with other appropriate hydrolytic enzymes may be used (e.g. xanthan and xanthanase, pectin and pectinase etc.).

Figure 4:
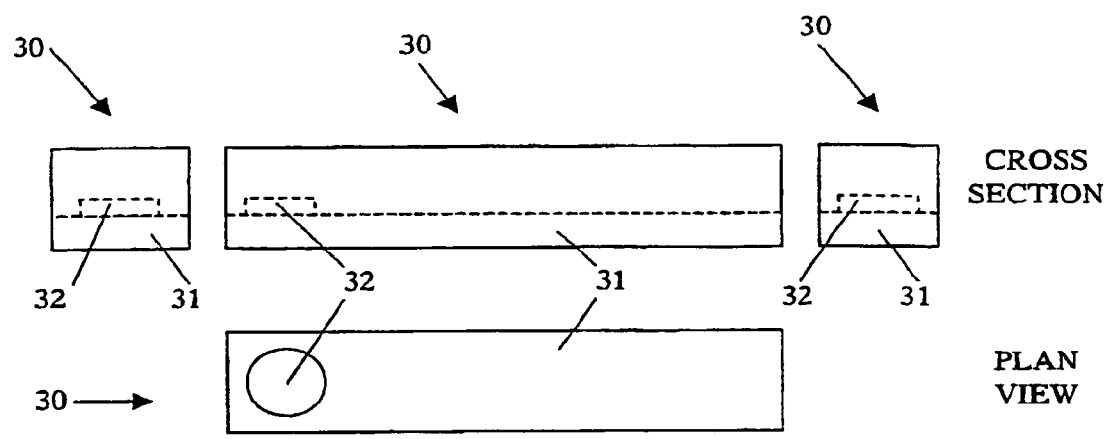
FIG. 4 shows a plan view and elevation of a time-temperature indicator.

FIG. 4 shows a practical example of an indicator in plan view and side elevations. Indicator 30 comprises a gel strip 31 upon which is immobilised water-soluble, lipid-insoluble gel in a matrix of frozen lipid 32.

Application Four—Triggerable Indicators.

When manufacturing the product as described in the second application above, the sensors as made must be transported below the trigger temperature. This can make manufacture difficult. To avoid this problem, the lipid phase can be immobilised as a solid or liquid in a discrete compartment. When activation is required, the product is cooled to below the trigger temperature whereupon the lipid (now solid) containing compartment is ruptured. Mechanical rupture has proved very successful although other triggering processes are not ruled out. When the temperature exceeds the melting point of the lipid, it melts and moves towards the agar phase and colour development occurs.

EXAMPLE TEN

Agar (1%) containing sodium bicarbonate (1%) was prepared as described above (3). Oleic acid containing cresol red or phenol red indicator (1%) was sealed in a small plastic or metal pouch and placed in a ring cut within the agar. The temperature was cooled to 5° C. whereupon the pouch was pierced. The contents remained in the pouch until the temperature exceeded 13.4° C. whereupon the lipid (containing cresol red) began to run out of the pouch and into the agar phase and colour developed.

In general, this application uses lipid and gel phases which are partitioned with barriers that are broken after cooling and the product becomes active. We have built many designs where the trigger is:

Mechanically ruptured by physical force (pressure, rotation etc.).

Activated by material contraction upon cooling.

Activated by enzymatic hydrolysis of lipid or gelling phases or a separating phase.

Activated by ripping out a barrier or film.

Activated by hydrating the gelling phase (pregelatinised starch is especially valuable) or a separate barrier phase.

Many other activation processes are possible and will be readily apparent to one skilled in the art.

Application Five

These technology allow the interesting idea of preparing barcodes which have an appearance which is time-temperature sensitive. Once the time-temperature transition has taken place, probably when the product in question has expired, the bar code reading changes. For example, individual lines or the whole bar code disappear. Alternatively colour may appear. This allows the creation of a system whereby expired product cannot be bar-code read or can give a different signal to a bar code reader allowing, for example, defectively stored supplies to be immediately identified and not accepted. Example constructions are as follows:

Lipid melting has been used to reveal or disguise part or all of the barcode.

The bars of the bar code have been printed with thermosensitive materials like lipids which, melt at a defined temperature and reveal temperature exposure.

Lipid containing a water soluble reactant has been placed in close contact with a thin gel phase above or below the barcode itself. Upon melting, the lipid makes contact with the gel and colour development occurs. This leads to the loss of visibility of the discrete lines.

The lipid may be replaced with other melting materials.

The barcode may be printed directly onto the product or packaging material. When the product has been heated up above the melting point of the material it melts and the code is lost.

Figure 5:
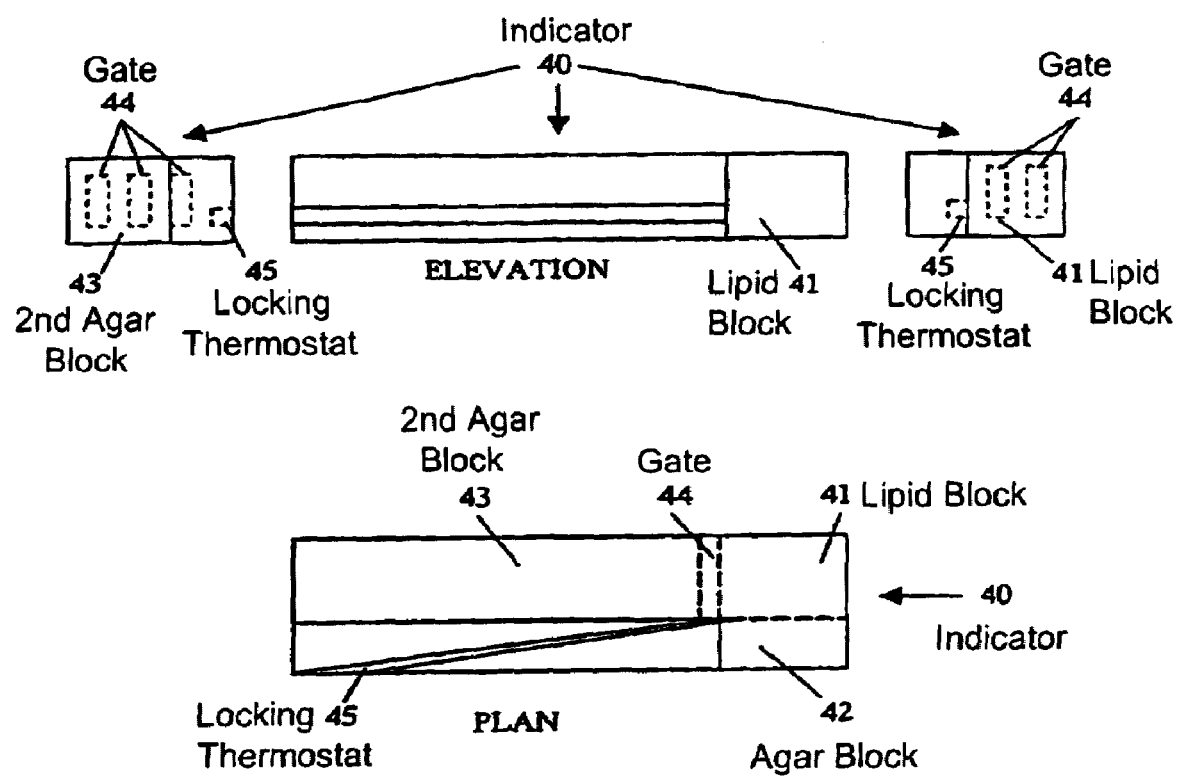
FIG. 5 shows a plan view and elevation of a temperature indicator having a thermostat controlled gate mechanism.

FIG. 5 shows an example triggerable indicator which can be used with the bar code concept. Indicator 40 has a PIP, for example a lipid block 41 which contains, as before, a water-soluble, lipid-insoluble dye. When it melts, it may contact agar block 42 giving a visual colour change as described above. Another agar block 43 is separated from the lipid block 41 by a gate 44. The gate may have a plurality of bars which block corresponding gaps in an adjacent wall, meaning that the gate has to move only the width of one bar to allow lipid/agar mixing. The gate is activated by a locking thermostat 45 which may, for example, by a bimaterial strip which bends with temperature and, optionally, a latch mechanism. Warming the device to a temperature causes the lipid block to melt giving an indication when the PR interacts with the first agar block 42. At a second temperature the thermostat allows the lipid block 41 to interact with agar block 43. The benefit of this device is that it can indicate both a short high temperature event (colour change in agar block 42) and have the capacity to indicate a longer high temperature event (through diffusion of dye in agar block 43).

Key benefits of the invention as described herein are that it provides a permanent and irreversible record that a temperature-time event has occurred. The technology can be activated at the point of manufacture or post manufacture by for example a consumer. This has the added advantage in that the products can be manufactured at ambient temperatures if required and shipped as such rather than under refrigeration.

Figure 6:
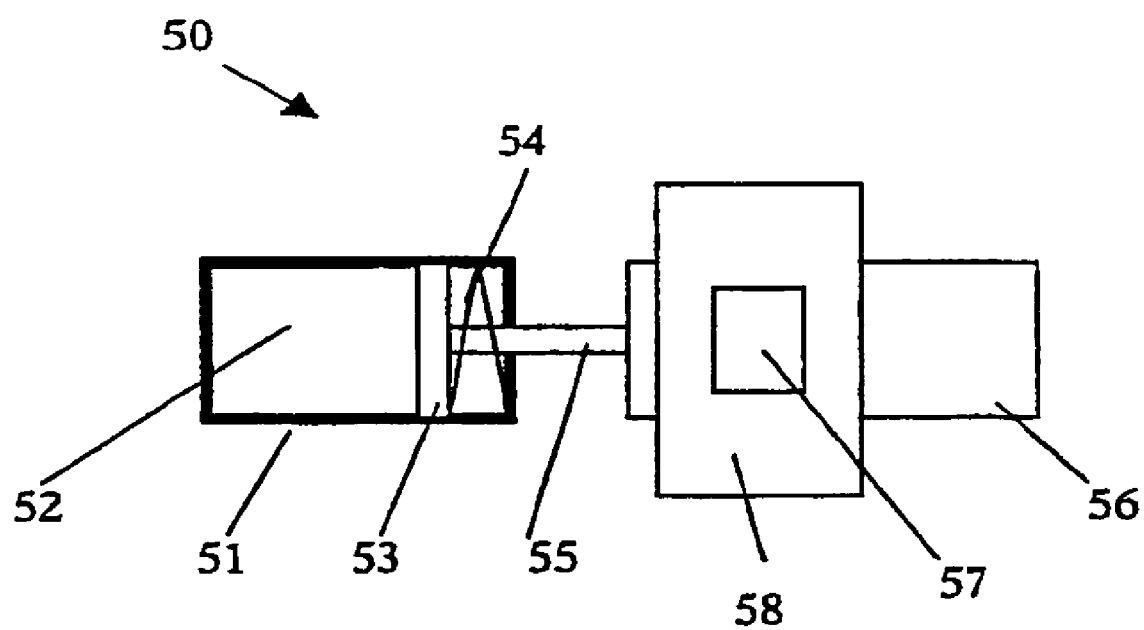
FIG. 6 shows a plan view and elevation of a yet further embodiment of a temperature history indicator.

FIG. 6 shows a cross-section through a further embodiment of the present invention. Indicator 50 comprises a cylinder 51 filled with a lipid 52 which contracts linearly with decrease in temperature. Change in volume of the lipid 52 drives a piston 53, the motion of which is opposed by a spring 54. The piston is attached by a joining member 55 to a card 56 which can be viewed through a window 57 in a further card 58. At low temperature, one part of card 56 is visible. At high temperature, the lipid expands, and the piston moves, lining the window 57 up with a region of card

56 which displays a message, or indicates a colour, to show that a particular temperature has been exceeded. A ratchet and pawl may be added to the piston in order to make the change in indication irreversible. Card 56 may simply be a bicoloured card, with e.g. green (indicating "safe" food product) visible at low temperatures and red (indication "hazardous" food) visible at high temperatures.

By using these time-temperature indicators on products, consumers will be able to verify that produce they purchase has been stored correctly prior to their purchase and will be able to check they look after it properly and do not use it once it is no longer fit. Manufacturers, distributors and retailers will be able to use the time-temperature indicators for internal quality control and quality assurance and will also better trust that materials protected by this technology have been supplied to them in the correct conditions with all due care. The bar code concept allows rapid verification of the quality of supplies.

As the invention can provide a dramatic visible change, it will give clear indication to consumers and, as it may be constructed of edible materials, it has the benefit of being able to be attached to actual fresh product directly instead of merely to its packaging. It will also therefore be considered safe and natural by consumers.

Further modifications and variations will be clear to one skilled in the art and may be made within the scope of the invention herein disclosed.

The invention claimed is:

1. In combination, an edible thermal history indicator and a food product, wherein the indicator is attached to the food product and which provides an indication that a predetermined temperature has been exceeded, the indicator comprising an edible reactant and an edible primary immobilizing phase, wherein the primary immobilizing phase is located directly on a surface of the food product, wherein the primary immobilizing phase comprises a temperature sensitive material selected to melt at a predetermined temperature, and wherein melting of the temperature sensitive material leads to the provision of an indication that the predetermined temperature has been exceeded.

2. The combination as claimed in claim 1, wherein the temperature sensitive material is selected from the group consisting of: simple and compound lipids, waxes, hydrocarbons, and esters of fatty acids.

3. The combination as claimed in claim 1, wherein the reactant is a dye.

4. The combination as claimed in claim 3, wherein the reactant is a water soluble dye.

5. The combination as claimed in claim 1, wherein the reactant is a micro-organism.

6. The combination as claimed in claim 1, wherein the reactant is an odorous material.

7. The combination as claimed in claim 1, wherein the thermal history indicator is configured to be located directly on the surface of the food product via stamping.

8. The combination as claimed in claim 1, wherein the thermal history indicator is configured to be located directly on the surface of the food product via ink jet printing.

9. The combination as claimed in claim 1, wherein the reactant and the primary immobilising phase are located directly on the surface of the food product as at least one film.

10. The combination indicator as claimed in claim 1, wherein the reactant is dispersed within the temperature sensitive material.

11. The combination as claimed in claim 10, wherein the reactant is dispersed within the temperature sensitive material and is located directly on the surface of the food product such that it provides a visual image through its shape before the temperature sensitive material melts, and wherein after the temperature sensitive material melts, the reactant loses its shape and destroys the visual image, thereby indicating that the predetermined temperature has been exceeded.

12. The combination as claimed in claim 1, wherein the reactant is initially immobilised in the temperature sensitive material, wherein the reactant is released upon melting of the temperature sensitive material, and wherein the released reactant provides an indication that the predetermined temperature has been exceeded.

13. The combination as claimed in claim 12, wherein the temperature sensitive material comprises a lipid, wherein the reactant comprises a water-soluble dye, and wherein when the water-soluble dye is released, the water-soluble dye forms a color on contact with water in the food product to which the indicator is affixed, the formation of the color leading to a visual indication that the predetermined temperature has been exceeded.

14. The combination as claimed in claim 1, wherein the reactant comprises a primary reactant, and wherein the thermal history indicator further comprises a secondary reactant located so that when the primary immobilising phase melts, the primary reactant comes into contact with the secondary reactant, which leads to an indication that the predetermined temperature has been exceeded.

15. The combination as claimed in claim 14, wherein the first and secondary reactants are, in either order, an enzyme and a substrate for the enzyme.

16. The combination as claimed in claim 14, wherein the first and secondary reactants are, in either order, a water soluble dye and water.

17. The combination as claimed in claim 1, further comprising a secondary immobilising phase located so that when the temperature sensitive material melts, the reactant comes into contact with the secondary immobilising phase, and wherein contact between the reactant and the secondary immobilising phase leads to an indication that the predetermined temperature has been exceeded.

18. The combination as claimed in claim 17, wherein the secondary immobilising phase comprises a polysaccharide.

19. The combination as claimed in claim 17, wherein the secondary immobilising phase comprises agar.

20. The combination as claimed in claim 17, wherein the secondary immobilising phase comprises gelatin.

21. The combination as claimed in claim 17, wherein the secondary immobilising phase comprises a lipid.

22. The combination as claimed in claim 17, wherein the reactant comprises a primary reactant, and further comprises a secondary reactant that is held in the secondary immobilising phase, and wherein melting of the first immobilising phase causes the first and second reactants to come into contact, thereby providing an indication that the predetermined temperature has been exceeded.

23. The combination as claimed in claim 22, wherein the first and secondary reactants are, in either order, an enzyme and a substrate for the enzyme.

24. The combination as claimed in claim 22, wherein the first and secondary reactants are, in either order, a water soluble dye and water.

25. The combination as claimed in claim 22, wherein the secondary immobilising phase forms a matrix to entrap the secondary reactant.

26. The combination as claimed in claim 22, wherein the secondary immobilising phase melts when the predetermined temperature is exceeded.

27. The combination as claimed in claim 17, wherein the secondary immobilising phase melts when the predetermined temperature is exceeded.

28. The combination as claimed in claim 1, further comprising a secondary immobilising phase which melts when the predetermined temperature is exceeded.

29. The combination as claimed in claim 1, wherein the food product is a foodstuff.

30. The combination as claimed in claim 1, wherein the temperature sensitive material is a lipid.

31. In combination, an edible thermal history indicator and a food product, wherein the indicator is attached to the food product, the indicator comprising an edible reactant and an edible primary immobilizing phase, the primary indicating phase comprising a temperature sensitive material, wherein the primary immobilizing phase is located directly on a surface of the food product such that it provides a visual image through its shape, wherein the temperature sensitive material melts at a particular temperature, thereby losing its shape and destroying the visual image, and thereby indicating that the particular temperature has been exceeded.

32. The combination as claimed in claim 31, wherein the shape comprises a user-recognizable pattern or character.

33. In combination, an edible thermal history indicator and a food product, wherein the indicator is attached to the food product, the indicator comprising an edible reactant dispersed within an edible primary immobilizing phase, wherein the primary indicating phase comprises a temperature sensitive material that is located directly on a surface of the food product, wherein the reactant is released upon melting of the temperature sensitive material, and wherein the released reactant provides an indication that a predetermined temperature has been exceeded.

34. In combination, an edible thermal history indicator and a food product, wherein the indicator is attached to the food product, the indicator comprising an edible reactant dispersed within an edible primary immobilizing phase, wherein the primary indicating phase comprises one of a simple lipid and a compound lipid, wherein the reactant comprises a water soluble dye, wherein the primary immobilizing phase is located directly on a surface of the food product and the water-soluble dye is released upon melting of the lipid, the released water soluble dye forming a color on contact with the water in the food product to which the indicator is affixed, and wherein formation of the color provides a visual indication that a predetermined temperature has been exceeded.

35. In combination, an edible thermal history indicator and a food product, wherein the indicator is attached to the food product, the indicator comprising an edible reactant dispersed within an edible primary immobilizing phase, wherein the primary indicating phase comprises a temperature sensitive material that is located directly on a surface of the food product within a packaging, wherein the reactant is released upon melting of the temperature sensitive material, and wherein the released reactant provides an indication that a predetermined temperature has been exceeded.

36. In combination, an edible thermal history indicator and a food product, wherein the indicator is attached to the food product, the indicator comprising an edible reactant and an edible primary immobilizing phase comprising a temperature sensitive material, wherein the primary immobilizing phase is directly attached to a surface of the food product, wherein the shape of the thermal history indicator forms a user-recognizable pattern or character, and wherein the temperature sensitive material melts at a particular temperature, thereby destroying the user recognizable pattern or character to indicate that the particular temperature has been exceeded.

* * * * *